Oct. 29, 1946.                G. E. DATH                2,410,152
                    FRICTION SHOCK ABSORBING MECHANISM
                           Filed June 25, 1943
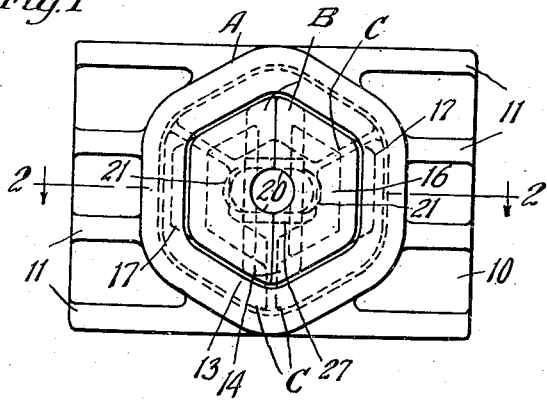
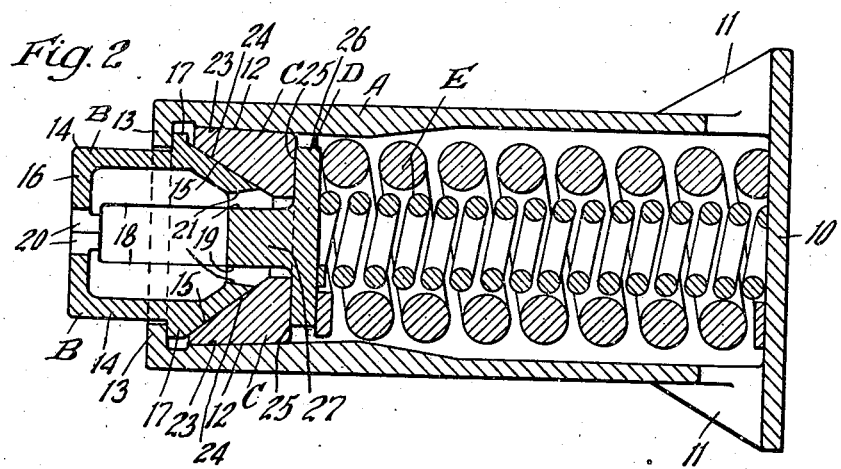
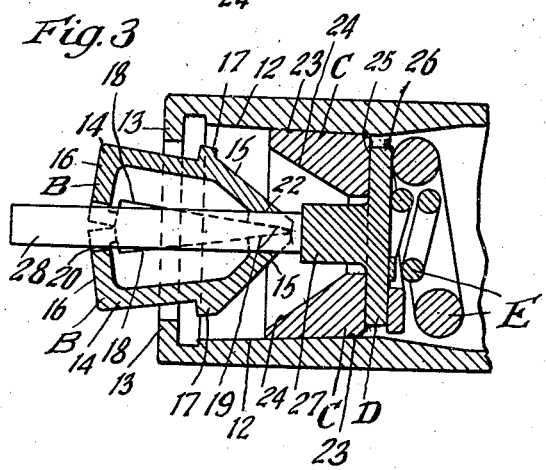
Inventor
George E. Dath
By Henry Fuchs
Atty.

Patented Oct. 29, 1946

2,410,152

UNITED STATES PATENT OFFICE 2,410,152

FRICTION SHOCK ABSORBING MECHANISM

George E. Dath, Chicago, Ill., assignor to W. H. Miner, Inc., Chicago, Ill., a corporation of Delaware Application June 25, 1943, Serial No. 492,258

10 Claims. (Cl. 213—34)

1

This invention relates to improvements in friction shock absorbing mechanisms.

The main object of the invention is to provide a friction shock absorbing mechanism, especially adapted for draft riggings of railway cars comprising a friction casing closed at one end and having the other end open, a friction clutch including a central wedge block and friction shoes surrounding the wedge block, and a spring resistance opposing movement of the clutch inwardly of the casing, wherein the spring resistance and clutch are insertable through the open end of the casing, and the parts of the mechanism are held assembled by shouldered engagement between casing and the wedge member of the clutch.

A more specific object of the invention is to provide a friction shock absorbing mechanism as specified in the preceding paragraph, wherein the wedge is in the form of a collapsible split member having lateral flanges in shouldered engagement with the casing to limit outward movement of the wedge and thereby hold the mechanism assembled, and wherein the wedge is held expanded and in shouldered engagement with the casing by a spreading member in the form of a spring follower cooperating with the friction shoes, the wedge being collapsible when said spreading member is disengaged therefrom to facilitate assembling of the parts of the mechanism.

Other objects of the invention will more clearly appear from the description and claims hereinafter following.

In the drawing forming a part of this specification, Figure 1 is a front end elevational view of a friction shock absorbing mechanism embodying my improvements. Figure 2 is a horizontal, longitudinal sectional view, corresponding substantially to the line 2—2 of Figure 1. Figure 3 is a view, similar to Figure 2 of the front end portion of the mechanism, illustrating the manner of assembling the parts thereof.

As shown in said drawing, my improved friction shock absorbing mechanism comprises broadly a casing A, providing a combined friction shell and spring cage; a two-piece split wedge B; three friction shoes C—C—C; a combined spring follower and spreading member D; and a spring resistance E.

The casing A is of substantial hexagonal interior and exterior cross section having the friction shell section at the forward end which is open, and the spring cage section at the rear end thereof. The casing A is closed at the rear end

2 by a transverse vertical wall 10 which projects at opposite sides beyond the side walls of the casing to provide a rear follower member of rectangular outline which is integral with the casing. The follower member is reinforced by webs 11—11 formed integral with the same and the casing side walls. The friction shell section of the casing is provided with six interior, substantially flat friction surfaces 12—12 which converge inwardly of the casing and are spaced symmetrically about the central longitudinal axis of the mechanism. The interior of the friction shell section thus presents six interior friction surfaces, adjacent surfaces of which are angularly disposed with reference to each other, thereby providing three pairs of surfaces, the adjacent members of each pair together forming a friction face of V-shaped transverse cross section.

At the open end the casing is provided with a continuous inturned retaining flange 13 which overhangs the opening and forms limiting stop means for the wedge block.

The wedge block B is centrally divided in lengthwise direction, thereby providing two similar sections 14—14. The split wedge block B, which is preferably hollow, as shown, is of hexagonal transverse cross section and has six inwardly converging flat wedge faces 15—15 arranged symmetrically about the central longitudinal axis of the mechanism. Three adjacent pairs of wedge faces are thus provided, the two wedge faces of each pair together forming a combined wedge face of V-shaped transverse cross section. At the outer end the split block B has a flat transverse abutment face 16, adapted to receive the actuating force, one half of said face being formed on each section of the block.

As shown most clearly in Figure 1, the block B is divided on a longitudinal plane intersecting the longitudinal central axis of the wedge and two diametrically opposite corners of the same. Each section 14 of the block thus has three of the sides of the hexagon outline of the wedge, one of the sides of which is parallel to the dividing plane of the wedge. At the last named side, each section 14 of the wedge is provided with a laterally outstanding stop flange 17. Two diametrically opposed stop flanges 17—17 are thus provided on the block B which are adapted to engage in back of diametrically opposed portions of the inturned flange 13 of the casing to limit outward movement of the wedge and hold the same assembled with the casing. The stop flanges 17—17 of the wedge block B are located some distance inwardly of the wedge block, as shown most clearly in Figures 2 and 3, whereby a substantial portion of the block normally projects beyond the outer end of the casing.

At the outer or forward end of the block B, the sections thereof are normally in bearing contact with each other. Immediately to the rear of the contacting portion the side walls of the sections 14—14 are cut away along the opposed edges of said sections, as indicated at 18—18, to provide clearance to permit collapsing of the wedge in assembling the same with the casing, as hereinafter pointed out. As shown in Figure 2, the opposed side edges of the cut away portions are substantially parallel in the assembled condition of the mechanism and present substantially flat opposed abutment faces 19—19 on said sections 14—14 at each side of the wedge block, adapted to cooperate with the combined spring follower and spreading member D, as hereinafter pointed out.

At the outer end thereof, the sectional wedge block B is provided with a central opening 20 to accommodate a tool in the form of a cylindrical bar used in assembling the device, one half of this opening being provided in each section 14—14, the abutting edges of the outer end portions of said sections being notched for this purpose. At the inner end, the opposed inner side portions of the sections 14—14 are also cut out or notched, as indicated at 21—21, to provide, when the wedge is collapsed as shown in Figure 3, an opening 22 in alignment with the opening 20 at the front end of the wedge through which the assembling tool may be passed.

The friction shoes C, which are three in number, are interposed between the wedge block B and the interior friction surfaces 12 of the casing. The three shoes C are of similar design except as hereinafter pointed out. Each shoe has a friction surface 23 on the outer side thereof of V-shaped transverse cross section which cooperates with the corresponding V-shaped friction face of the casing formed by two adjacent surfaces 12—12 of the casing. At the inner side, that is, the side nearest the central axis of the mechanism, each shoe has a wedge face 24 of V-shaped transverse cross section cooperating with two adjacent wedge faces 15—15 of the wedge block B, the two portions of the wedge face 24 forming the V being substantially flat and correspondingly inclined to the cooperating wedge faces 15—15 of the wedge block. The engaging wedge faces of the wedge and two of the shoes are preferably disposed at relatively blunt wedging angles with respect to the longitudinal central axis of the mechanism, and those of the wedge and the remaining shoe are preferably disposed at a relatively keen wedging angle with respect to said axis. At their rear ends the shoes C—C—C are provided with substantially flat, transverse abutment faces 25 adapted to cooperate with the spring follower section of the combined spring follower and spreading member D.

The combined spring follower and spreading member D comprises a heavy platelike section 26 of hexagonal outline having a forwardly projecting central post member 27 formed integral therewith. The post member 27 is of substantially rectangular cross section and of such a thickness as to fill the space between the opposed abutment faces 19—19 of the sections 14—14 of the wedge B, to hold said wedge expanded as shown in Figure 2.

The spring resistance E comprises a relatively heavy outer coil and a lighter inner coil. The coils of the spring resistance have their opposite ends bearing respectively on the spring follower D and the wall 10 of the casing A. The spring resistance E is preferably under initial compression in the assembled condition of the mechanism.

In assembling the mechanism the spring resistance E, the combined spring follower and spreading member D, and the shoes C—C—C are first placed within the casing A by inserting these parts through the open front end of the casing. With the casing A standing on end, the spring follower D is forced inwardly by a cylindrical bar-like tool 28 engaged with the outer end of the post 27 of the follower D. As the spring follower D is forced inwardly, the shoes C—C—C, which are resting on the follower, will move inwardly therewith. When these parts have been displaced inwardly of the casing approximately to the position shown in Figure 3, the wedge B in the collapsed condition shown in Figure 3 is entered within the casing to an extent that the retaining flanges 17—17 of the wedge will be disposed inwardly or to the rear of the inturned flanges 13 of the casing. The tool 28 is then withdrawn from engagement with the combined spring follower and spreading member while the wedge is held in the position shown in Figure 3. At the same time the sections 14—14 of the wedge are rocked on each other at their outer ends to spread the inner ends apart and permit entry of the post 27 of the combined spring follower and spreading member D therebetween as the member D is forced outwardly by the expansive action of the spring resistance. As will be evident, the flanges 17—17 of the wedge block B are thus brought into the operative position shown in Figure 2, in back of the flange 13 of the casing, to limit outward movement of the wedge block.

The operation of my improved shock absorbing mechanism is as follows: Upon inward movement of the wedge B with respect to the casing A being produced due to the compression of the mechanism, the spring resisted friction shoes are wedged apart and carried inwardly of the mechanism compressing the spring resistance E. High frictional resistance is thus produced between the friction surfaces of the shoes and casing. Upon the actuating force being reduced, the expansive action of the spring resistance E returns all of the parts to the normal position shown in Figure 2, outward movement of the wedge being limited by shouldered engagement of the flanges 17 thereof with the flanges 13 of the casing A.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing open at one end and permanently closed at the other end, said casing having interior stop shoulders at said open end; of a sectional collapsible wedge block, each of said sections of the block having a lateral projection, said projections being engageable with said shoulders of the casing to limit outward movement of the wedge; friction shoes having sliding engagement with the interior walls of the casing and wedging engagement with said wedge block; spring means opposing inward movement of said shoes; and means engaged between the sections of the wedge to hold the same expanded with the lateral projections thereof engaged in back of the stop shoulders of the casing.

2. In a friction shock absorbing mechanism, the combination with a friction casing open at one end and permanently closed at the other end, said casing having inturned stop flanges at said open end; of a plurality of friction shoes having sliding frictional engagement with the interior of said casing; a sectional collapsible wedge block having wedging engagement with said shoes, each of the sections of said wedge block having a laterally projecting flange, said flanges being engageable in back of the flanges of the casing to limit outward movement of the wedge; a spreading member engaged between said sections of the wedge to hold the wedge expanded with the flanges thereof in position to engage said flanges of the casing; and spring means yieldingly resisting inward movement of the shoes.

3. In a friction shock absorbing mechanism, the combination with a friction casing open at one end and permanently closed at the other end, said casing having inturned stop flanges at said open end; of a plurality of friction shoes having sliding frictional engagement with the interior of said casing; a sectional collapsible wedge block having wedging engagement with said shoes, each of the sections of said wedge block having a laterally projecting flange, said flanges being engageable in back of the flanges of the casing to limit outward movement of the wedge; a spreading plug engaged between said sections of the wedge to hold the wedge expanded with the flanges thereof in position to engage said flanges of the casing; and spring means yieldingly resisting inward movement of said shoes and said plug.

4. In a friction shock absorbing mechanism, the combination with a friction casing open at one end and permanently closed at the other end, said casing having inturned stop flanges at said open end; of a plurality of friction shoes having sliding frictional engagement with the interior of said casing; a sectional collapsible wedge block having wedging engagement with said shoes, each of the sections of said wedge block having a laterally projecting flange, said flanges being engageable in back of the flanges of the casing to limit outward movement of the wedge; spring resistance means within the casing; and a spring follower plate interposed between said spring resistance and shoes, said spring follower having a spreading post thereon engaged between the sections of the wedge to hold the wedge expanded with the flanges thereof in position to engage said flanges of the casing.

5. In a friction shock absorbing mechanism, the combination with a friction casing open at one end and permanently closed at the other end, said casing having inturned stop flanges at said open end; of a plurality of friction shoes having sliding frictional engagement with the interior of said casing; a sectional collapsible wedge block having wedging engagement with said shoes, each of the sections of said wedge block having a laterally projecting flange, said flanges being engageable in back of the flanges of the casing to limit outward movement of the wedge; spring resistance means within the casing; and a combined spring follower and spreading member, comprising a spring follower section and a projecting post engaged between the sections of the wedge to hold the wedge expanded with the flanges thereof in position to engage said flanges of the casing, said spring follower section being interposed between the spring resistance and the inner ends of the shoes.

6. In a friction shock absorbing mechanism, the combination with a friction casing open at one end and having inturned stop flanges at said open end; of a plurality of friction shoes having sliding frictional engagement with the interior of said casing; a two-piece lengthwise divided sectional collapsible wedge block having wedging engagement with said shoes, the sections of said wedge block having laterally projecting flanges engageable in back of the flanges of the casing to limit outward movement of the wedge; a spreading member engaged between said sections of the wedge to hold the wedge expanded with the flanges thereof in position to engage said flanges of the casing; and spring means yieldingly resisting inward movement of the shoes.

7. In a friction shock absorbing mechanism, the combination with a friction casing open at one end and having inturned stop flanges at said open end; of a plurality of friction shoes having sliding frictional engagement with the interior of said casing; a two-piece lengthwise divided collapsible wedge block having wedging engagement with said shoes, the sections of said wedge block having laterally projecting flanges engageable in back of the flanges of the casing to limit outward movement of the wedge; a combined spring follower and spreading member comprising a spring follower plate section bearing on the inner ends of the shoes, and a forwardly projecting spreading plug on said plate section engaged between the two sections of the wedge to hold the wedge expanded with the flanges thereof in position to engage said flanges of the casing; and spring means within the casing yieldingly opposing inward movement of said combined spring follower and spreading member.

8. In a friction shock absorbing mechanism, the combination with a friction casing open at one end and having inturned stop flanges at said open end; of a plurality of friction shoes having sliding frictional engagement with the interior of said casing; a two-piece lengthwise divided wedge, having wedging engagement with said shoes, the sections of said wedge being laterally spaced from each other at the inner end of the wedge and having fulcrumming engagement with each other on their inner sides at the outer end of the wedge; each section of said wedge having a laterally outwardly projecting flange engageable in back of the corresponding flange of the casing to limit outward movement of the wedge; a combined spring follower and spreading member comprising a spring follower plate section bearing on the inner ends of the shoes, and a forwardly projecting spreading post on said plate section projecting into and filling the space between said sections at the inner end of the wedge to hold said sections separated with the flanges thereof in position to engage the casing flanges; and spring means within the casing opposing inward movement of said combined spring follower and spreading member.

9. In a friction shock absorbing mechanism, the combination with a friction casing open at one end and having inturned stop flanges at said open end; of an annular series of three friction shoes having sliding frictional engagement with the interior of the casing; a two-piece lengthwise divided collapsible wedge block having wedging engagement with said shoes, the sections of said wedge block having laterally projecting flanges engageable in back of the flanges of the casing to limit outward movement of the wedge; a combined spring follower and spreading member comprising a spring follower section bearing on the inner ends of the shoes, and a forwardly projecting spreading plug, formed on said spring follower section engaged between the two sections of the wedge to hold the wedge expanded with the flanges thereof in position to engage said flanges of the casing; and springs resisting inward movement of said combined spring follower and spreading member.

10. In a friction shock absorbing mechanism, the combination with a hexagonal friction casing having six interior, longitudinally extending, inwardly converging, interior friction surfaces, and inturned stop flanges at the outer ends of said friction surfaces; of three V-shaped friction shoes arranged symmetrically about the longitudinal axis of the mechanism, each of said shoes having sliding engagement with two adjacent friction surfaces of the casing; a two-piece lengthwise divided collapsible wedge block having wedging engagement with said shoes, the sections of said wedge block having laterally projecting flanges engageable in back of the flanges of the casing to limit outward movement of the wedge; a combined spring follower and spreading member comprising a spring follower section bearing on the inner ends of the shoes, and a forwardly projecting spreading plug formed on said spring follower section engaged between the two sections of the wedge to hold the wedge expanded with the flanges thereof in position to engage said flanges of the casing; and springs resisting inward movement of said combined spring follower and spreading member.

GEORGE E. DATH.